US006070323A

United States Patent [19]

Koike et al.

[11] Patent Number: 6,070,323
[45] Date of Patent: Jun. 6, 2000

[54] PISTON FOR INTERNAL COMBUSTION ENGINE AND MATERIAL THEREFORE

[75] Inventors: Toshikatsu Koike; Hirotaka Kurita; Hiroshi Yamagata, all of Iwata, Japan

[73] Assignee: Yamaha Hatsudoki Kabushiki Kaisha, Iwata, Japan

[21] Appl. No.: 09/022,647

[22] Filed: Feb. 12, 1998

[30] Foreign Application Priority Data

| | | | |
|---|---|---|---|
| Feb. 12, 1997 | [JP] | Japan | 9-042951 |
| Feb. 13, 1997 | [JP] | Japan | 9-044709 |

[51] Int. Cl.[7] ..... B23P 15/00

[52] U.S. Cl. ..... 29/888.04; 29/888.048

[58] Field of Search ..... 29/888.04, 888.047, 29/888.048; 123/193.6; 92/208

[56] References Cited

U.S. PATENT DOCUMENTS

| | | | |
|---|---|---|---|
| 1,835,863 | 12/1931 | Greve | 29/888.04 |
| 3,009,237 | 11/1961 | Lehmeier | 29/888.04 |
| 3,070,414 | 12/1962 | Wilcoxon | 29/888.04 |
| 4,051,590 | 10/1977 | Halter et al. | 29/DIG. 31 |

*Primary Examiner*—Irene Cuda
*Attorney, Agent, or Firm*—Knobbe, Martens, Olson & Bear LLP

[57] ABSTRACT

A method of forming a piston for a reciprocating machine such as an engine. The piston is formed from a powdered material that is comprised of aluminum alloyed with a material selected from the group of silicon (Si) and iron (Fe) having a particle diameter not greater than 10 $\mu$m. The resulting alloy is then forged into a piston having a piston head and a piston skirt. The powder which is solidified and forged is formed by a process comprising the steps of forming an ingot from an alloy comprised of aluminum and an alloying material. This ingot is then melted and dispersed as a liquid in a chilling stream to form powdered metal particles. These powdered metal particles are then compressed into a blank having a cylindrical configuration for subsequent forging.

24 Claims, 7 Drawing Sheets

Fatigue strength

PISTON FOR INTERNAL COMBUSTION ENGINE AND MATERIAL THEREFORE

BACKGROUND OF THE INVENTION

This invention relates to a piston for a reciprocating machine and more particularly to an improved material and process for forming such a piston.

In reciprocating machines and particularly those like an engine, be they of the two or four cycle type, the piston is subject to quite high loading and conditions which provide substantial but different stresses thereon. That is, a conventional engine piston has a piston head which faces and defines in part the combustion chamber. This piston head may be formed with one or more piston ring grooves for sealing purposes with the associated cylinder bore. In addition, the piston has a skirt portion that provides slidable engagement with the cylinder bore.

It is necessary that the head of the piston have a very high heat resistance due to its exposure to the combustion chamber. The skirt portion, on the other hand, should have very high abrasion resistance and strength to prevent cracking or breaking.

In addition to these stress considerations, it is also desirable to have the piston be light in weight and to have a relatively thin wall construction, particularly in the skirt area, to accomplish this light weight. The light weight obviously reduces the reciprocating forces and the amount of weight that must be balanced. However, the material should also be high in fatigue strength, particularly under high temperatures and provide high abrasion resistance.

It has been the general practice to form the pistons for engines and other reciprocating machines from aluminum (Al) or an aluminum alloy. Silicon (Si) is employed as an alloying material for increasing abrasion resistance and resistance to cracking. Copper (Cu) and magnesium (Mg) have also been employed as alloying materials to increase the strength. It has also been proposed to add a material such as a ceramic fiber like aluminum oxide ($AL_2O_3$) or silicon carbide (SiC) which are harder components than the silicon for improving the abrasion resistance in at least the skirt area.

Normally, the piston is formed by a casting process. A difficulty with the casting process for forming the piston is that the molding of the piston and subsequent solidification causes the solidified texture of the metal to become relatively coarse and thus reduce its strength and creates brittleness. Forging can avoid these tendencies.

Iron (Fe) is also frequently added to increase the abrasion resistance and fatigue strength of the finished piston. However, like the use of silicon and silicon carbides the utilization of these alloying materials in a casting process gives problems upon solidification. This is primarily due to the fact that the metal ingredients have different melting points and the molding process does not assure uniformity in the material dispersion nor in the crystal size. Forging can also avoid these tendencies If, however, silicon is employed in the alloy, then forming the piston by forging presents certain other problems. Normally, the silicon employed in the piston formation has a primary silicon crystal configuration of greater than 10 $\mu$m in size. As a result, thy is a likelihood that the primary crystal silicon particles in the skirt portion will become fractured when forging. This can cause cracks to be formed in the boundaries between the silicon particles and the remainder of the matrix. This reduces the fatigue strength of the skirt portion substantially.

It is, therefore, a still further object of this invention to provide an improved method and material for forming a piston by forging utilizing a powdered metal process having the desired alloy characteristics.

SUMMARY OF THE INVENTION

A first feature of this invention is adapted to be embodied in a method of forming a piston for a reciprocating machine such as an engine. The piston is formed from a powdered material that is comprised of aluminum alloyed with a material selected from the group of silicon (Si) and iron (Fe) having a particle diameter not greater than 10 $\mu$m. The resulting alloy is then forged into a piston having a piston head and a piston skirt In accordance with another feature of the invention, the powder which is solidified is formed by a process comprising the steps of forming an ingot from the alloy and the aluminum and alloying material. This ingot is then melted and dispersed as a liquid in a chilling stream to form powdered metal particles. These powdered metal particles are then compressed into a blank having a cylindrical configuration for subsequent forging.

DETAILED DESCRIPTION OF THE PREFERRED EMBODIMENTS OF THE INVENTION

Figure 1:
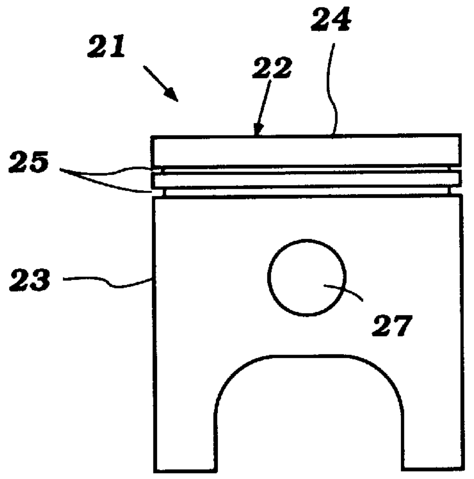
FIG. 1 is a side elevational view of a finished piston constructed in accordance with an embodiment of the invention and formed utilizing materials embodying the invention.
Figure 2:
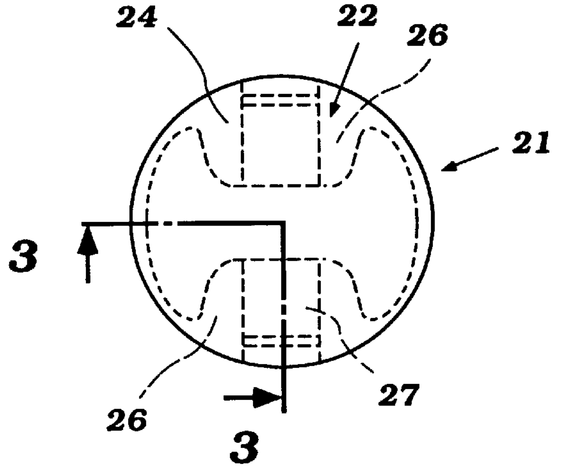
FIG. 2 is a top plan view of the piston.
Figure 3:
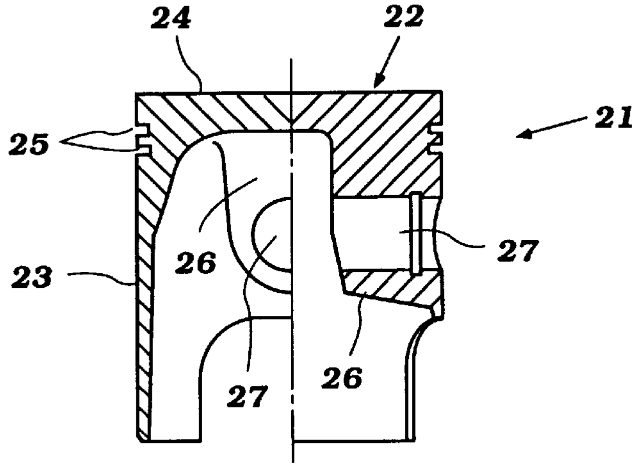
FIG. 3 is a cross-sectional view taken along the line 3—3 of FIG. 2.

Referring now in detail to FIGS. 1–3, a piston formed in accordance with a method embodying the invention and utilizing materials also embodying the invention is identified generally by the reference numeral 21. The piston 21 is comprised of a head portion 22 and a skirt portion 23. The head portion 22 is formed with a top surface 24 which forms the combustion chamber facing portion of the piston 21. This head portion has formed below it ring grooves 25 which are machined and from which the skirt portion 23 depends.

Piston pin bosses 26 are formed in the interior of the piston 21 and are machined to form piston pin receiving bores 27. The general construction of the piston 21 as thus far described may be considered to be conventional.

As should become apparent from the foregoing description, the invention here deals with the method by which the piston 21 is formed and the material employed to form the piston and the way in which this material is formed into a blank from which the piston 21 may be forged.

Figure 4:
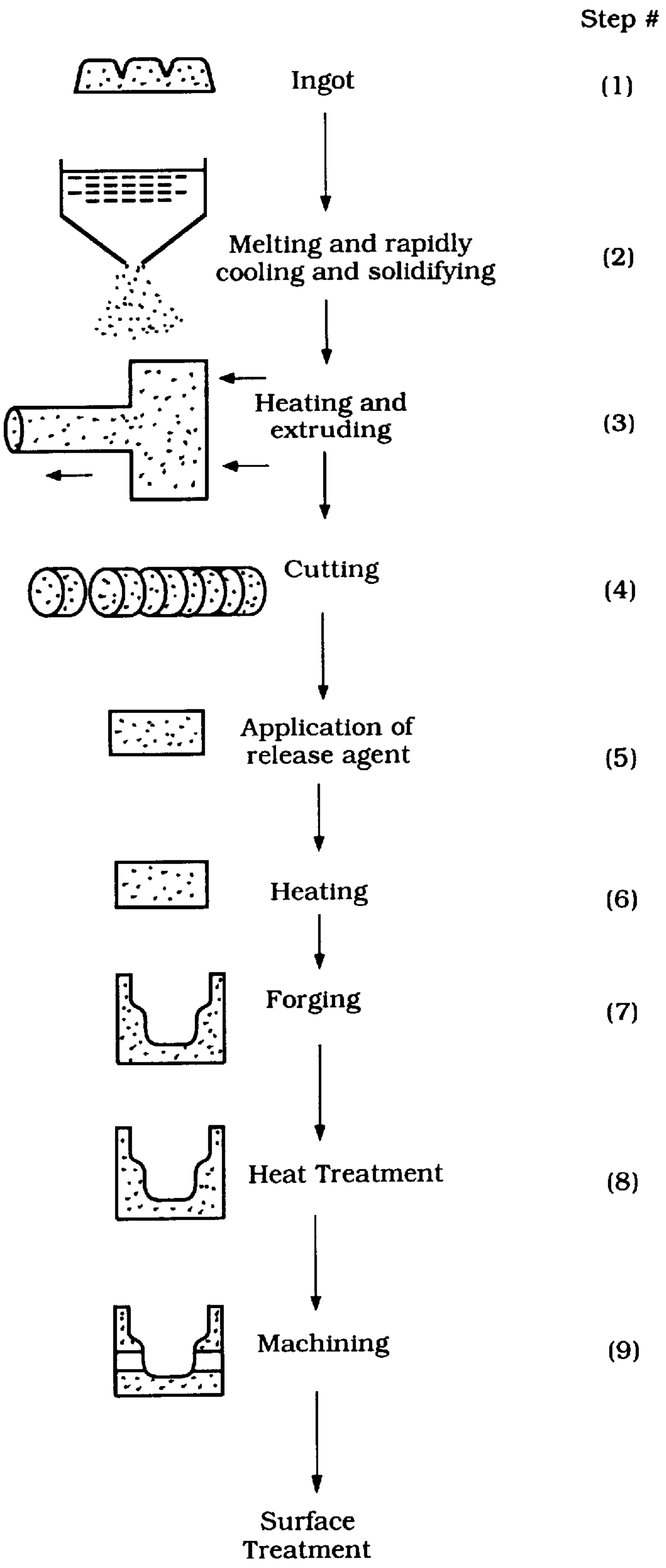
FIG. 4 is a series of views showing the various processes and the steps through which the piston is formed in accordance with the invention.

FIG. 4 is a graphical view that shows the various steps in the forging process and including the steps by which the material from which the piston blank is forged is formulated and manufactured. In this drawing, the step 1 indicates the formation of the ingot from which the powdered metal is formed and from which at least a substantial portion of the material of the final piston will be forged. This ingot is formed from an alloy of aluminum and certain alloying materials which are added to improve its strength, abrasion resistance and resistance to deterioration under heat Basically, this ingot is formed from an aluminum alloy that consists of aluminum (Al) as a base material and certain alloying materials such as silicon (Si), iron (Fe), and other materials as will be noted. As will become apparent as this description proceeds, the ingot is subsequently converted into a metal powder state which is subsequently heated and extruded to form blanks from which the piston 21 is forged.

Certain of these alloying materials may not be included directly in the ingot but may be formed as separate powders which are then mixed with the ingot powder during the extrusion and heating step that forms the formed metal blanks for forging. As will be described below, silicon carbide (SiC) is one of such materials that may be seperately mixed with the powder formed from the ingot.

EXAMPLE 1

A first example of the material from which the ingot may be formed includes as alloying materials to the base aluminum (Al) the following alloying elements:

| | |
|---|---|
| silicon (Si) | 10–22% by weight |
| iron (Fe) | 1–10% by weight |
| copper (Cu) | 0.5–5% by weight |
| magnesium (Mg) | 0.5–5% by weight |
| manganese (Mn) | 1% or less by weight |
| nickel (Ni) | 1% or less by weight |
| chromium (Cr) | 1% or less by weight |
| zirconium (Zr) | 2% or less by weight |
| molybdenum (Mo) | 1% or less by weight |

The silicon alloying material improves abrasion resistance and resistance to cracking or breaking and is in the form of hard primary crystals or eutectic crystals in the metal texture. Iron is added to obtain high strength at temperatures of 200° C. or more and by disbursing and strengthening the metal texture. Copper and magnesium are added to improve the strength at temperatures less than 200° C. It has been found that amounts greater than outside the ranges specified may fail to obtain the desired abrasion resistance and strength at the varying temperatures.

EXAMPLE 2

A specific example of alloying material that falls within the range of Example 1 and which is preferred is as follows:

| | |
|---|---|
| silicon (Si) | 17% |
| iron (Fe) | 5% by weight |
| copper (Cu) | 1% by weight |
| magnesium (Mg) | 5% by weight |
| manganese (Mn) | 0.01% by weight |
| nickel (Ni) | 0.01% by weight |
| chromium (Cr) | 0.01% by weight |
| zirconium (Zr) | 1% by weight |
| molybdenum (Mo) | 0.01% by weight |

EXAMPLE 3

Another range of embodiment of alloy that can be employed in connection with the invention employs Silicon carbide (SiC) as an alloying material and has the following alloying elements:

| | |
|---|---|
| silicon (Si) | 10–22% by weight |
| iron (Fe) | 1–10% by weight |
| copper (Cu) | 0.5–5% by weight |
| magnesium (Mg) | 0.5–5% by weight |
| manganese (Mn) | 1% or less by weight |
| nickel (Ni) | 1% or less by weight |
| chromium (Cr) | 1% or less by weight |
| zirconium (Zr) | 2% or less by weight |
| molybdenum (Mo) | 1% or less by weight |
| silicon carbide (SiC) | 1–10% by weight |

EXAMPLE 4

A specific preferred embodiment employing silicon carbide as an alloying agent and falling within the range of Example 3 includes the following components:

| | |
|---|---|
| silicon (Si) | 17% by weight |
| iron (Fe) | 5% by weight |
| copper (Cu) | 1% by weight |
| magnesium (Mg) | 0.5% by weight |
| manganese (Mn) | 0.01% by weight |
| nickel (Ni) | 0.01% by weight |
| chromium (Cr) | 0.01% by weight |
| zirconium (Zr) | 1% by weight |
| molybdenum (Mo) | 0.01% by weight |
| silicon carbide(SiC) | 5% by weight |

In addition to silicon carbide, other materials such as aluminum oxide ($Al_2O_3$) or aluminum nitride (AIN) may be substituted to improve abrasion resistance in the amounts specified in Examples 3 and 4, i.e. 1–10% or specifically 5%.

It has been found that the crystalline size of certain of the alloying materials is important in obtaining the desired abrasion resistance, resistance to cracking and high fatigue strength. For example, the initial crystalline silicon particle diameter should be not greater than 10 $\mu$m. Also, the average particle diameter of the iron should be not greater than 10 $\mu$m. Where as has been previously noted, these alloying materials may be either incorporated in the ingot from which the powder is formed or may be formed from separate particles that are molded into the pellet through mixing with the particles formed from the primary aluminum alloy. Either method can be employed so long as the resulting crystalline particle size is within the range set forth.

In the examples given as Example 3 and Example 4 it is particularly advantageous to add the silicon carbide (SiC) as a separate powder mixed with the powder from the ingot before solidifying. If this is done the particle size of the silicon carbide (SiC) powder before mixing should preferably be 5 μm.

The way in which the particles are formed is shown in step 2 of FIG. 4. In this step, the ingot from the alloy and the base materials are melded at a temperature of 700° C. or more. This molten material is then sprayed like a fog and rapidly cooled to solidify at a cooling rate of at least 100° C. per second thereby obtaining a rapidly solidified powder metal of the aluminum alloy. It has been found that good results can be obtained when the specific particle size of the wear-resistant material such as the silicon carbide has a diameter of 5 μm. As has been noted, this is particularly useful when the particles are formed separately and combined in the next step which will be described.

Referring now to the step 3 of FIG. 4, the powdered material is formed into a metallic extrusion to form the alloy. For example, the powder can be heated and extruded under pressure at a temperature of less than 700° C. and preferably in the range of 400–500° C. and extruded into a round rod. Other forms can be employed for so forming the resulting pressed material. The heating may be done before the molding so long as the material temperature is maintained. Alternatively, the heating may be done during the actual molding process.

For example, it is possible to mold the aluminum melted metal powder between a pair of rolls to roll form the discs for extrusion. Also, it is possible to employ a rectangular shaped body and then forge it into the disc shape. Regardless of the molding technique in which to form the blanks they may either be cut or otherwise formed as shown in step 4 to form the individual cylindrical blanks which will be forged.

Then, at the step 5, a known type of release material is applied to the exterior of the blank. This release material may be of any type known in the forging process.

Figure 6:
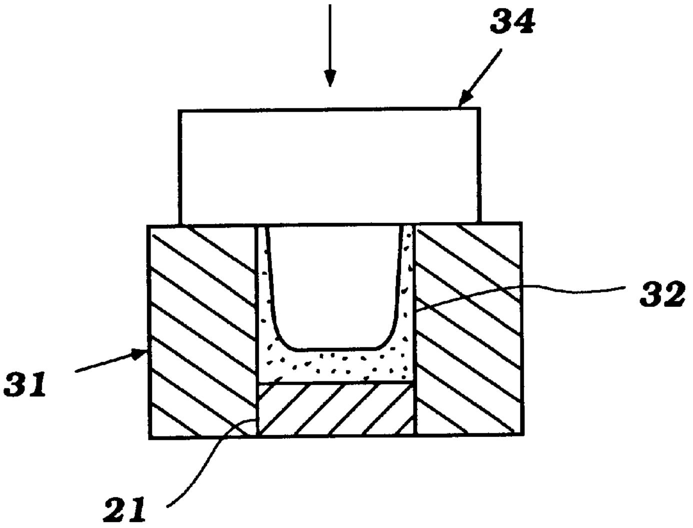
FIG. 6 is a cross-sectional view showing the final forging step.
Figure 7A:
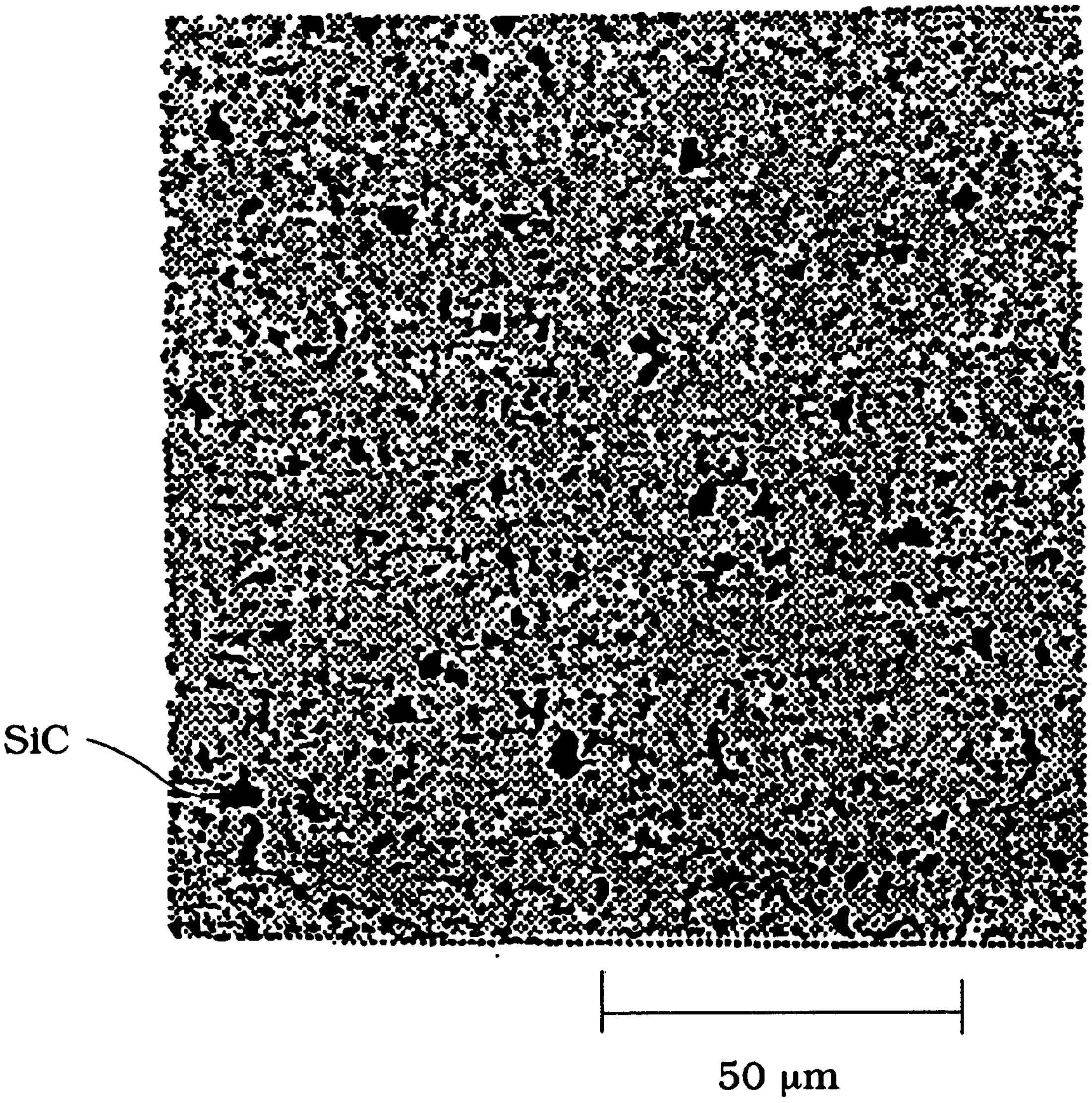
FIG. 7 is a three-part view comprised of photographs of the metal components of the material from which the piston is formed in the embodiments of the invention, shown in Parts A and B, and compared with a conventional piston material construction, as shown in Part C.
Figure 7C:
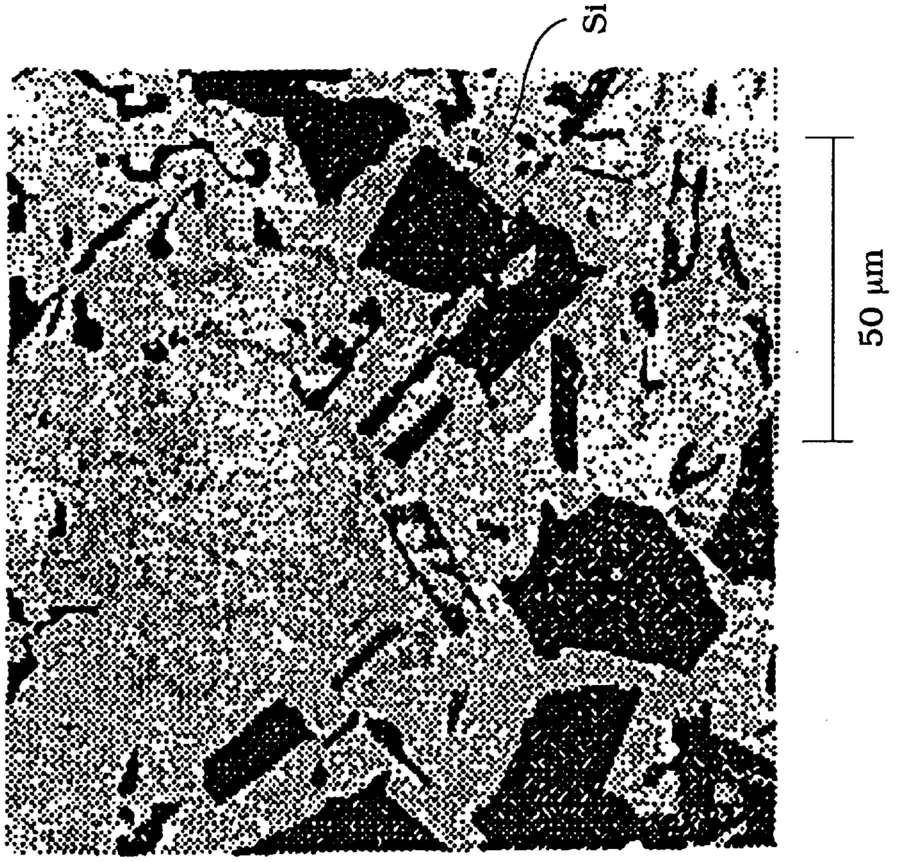
Figure 7B:
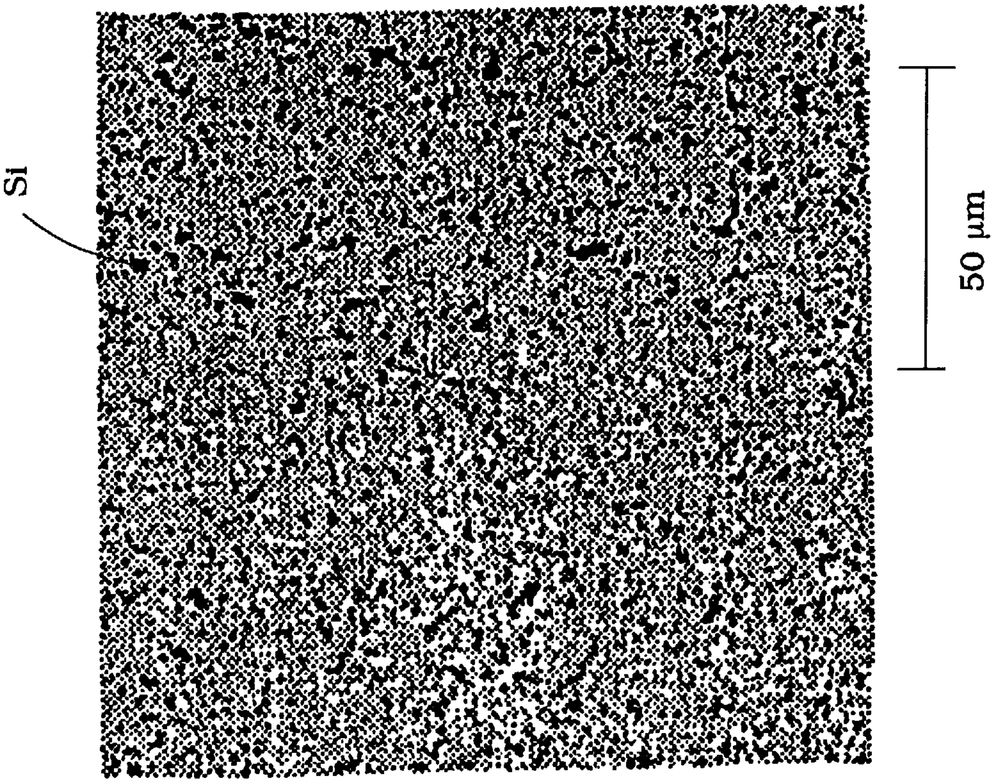

Referring again back to FIG. 4, after the release agent has been applied at the step 5, the blank is heated at the step 6. Preferably, the amount of heat is to bring the blank up to a temperature of less than 700° C. and preferably in the range of 400–500° C. and place the blank into a mold as seen in FIGS. 6 and 7. For the forging step 7 of FIG. 4.

Figure 5:
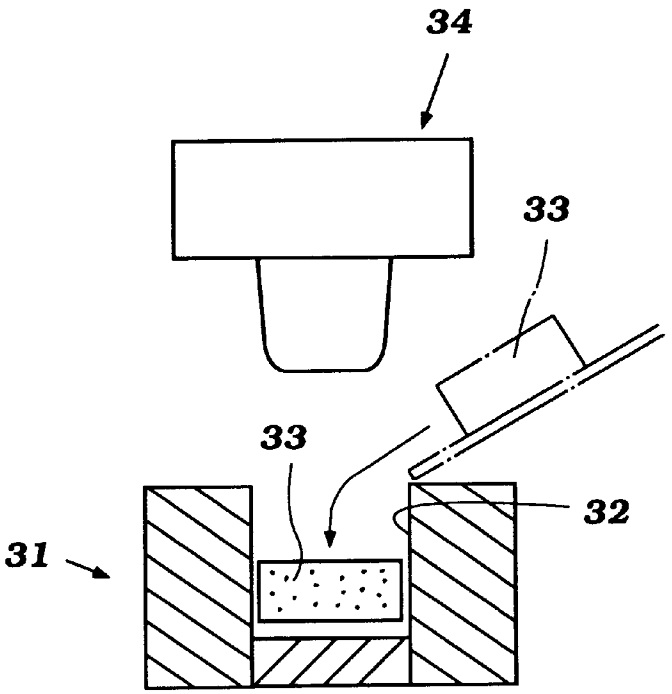
FIG. 5 is a cross-sectional view showing a step of the forging technique.

As seen in FIGS. 5 and 6, the female mold is identified by the reference numeral 31 and has a cavity 32 into which the blank, indicated by the reference numeral 33 is applied. A mandrel or closing press 34 is then pressed into the mold as shown in FIG. 6 so as to apply the pressure to extrude or forge the blank 33 into the shape of the finished but unmachined piston 21. Alternatively, the mold 31 and press 34 can be preheated to a temperature less than 700° C. and preferably in the the 400–500° C. temperature range. The blank be placed therein for a time to elevate to this temperature.

After the forging step the piston 21 is removed from the forging fixture. Subsequently a heat treating operation may be performed as shown in FIG. 4 at step 8. This is done to improve the strength.

Subsequently a machining of the piston ring grooves and boring and honing of the piston pin holes 27 is done at the step 9. Finish machining of other surfaces may also be performed.

Finally a surface coating may be applied to the skirt area 23, if desired.

As may be seen in FIG. 7, the resulting crystalline structure in finished piston is such that the particle sizes, particularly of the harder elements are much smaller than the prior art type construction as shown in view C of this figure.

As seen in view C of FIG. 7, the conventional technique including silicon results in very large particle sizes. This shows the structure of a cast piston formed from a base aluminum alloyed with 10–22% by weight silicon, 1% by weight or less of iron, 0.5–5% by weight copper, 0.5–2% by weight magnesium, 1% by weight or less of manganese, 1% or less by weight of nickel and 1% by weight or less of copper. This is a type of alloy commonly used in the manufacture of pistons.

The specific example and that illustrated in FIG. 7 C has the following specific conventional, composition of aluminum alloy.

| | |
|---|---|
| silicon (Si) | 19% by weight |
| iron (Fe) | 0.2% by weight |
| copper (Cu) | 4% by weight |
| magnesium (Mg) | 1% by weight |
| manganese (Mn) | 0.1% by weight |
| nickel (Ni) | 0.1% by weight |
| chromium (Cr) | 0.1% by weight |

As seen in views A and B of FIG. 7, where A is a piston formed from an aluminum alloy containing silicon carbide (Example 4 above) and B is an alloy that contains no silicon carbide (Example 2 above), the particle size is much smaller and as previously noted less than 10 μm in the case of the silicon and/or silicon carbide.

Figure 8:
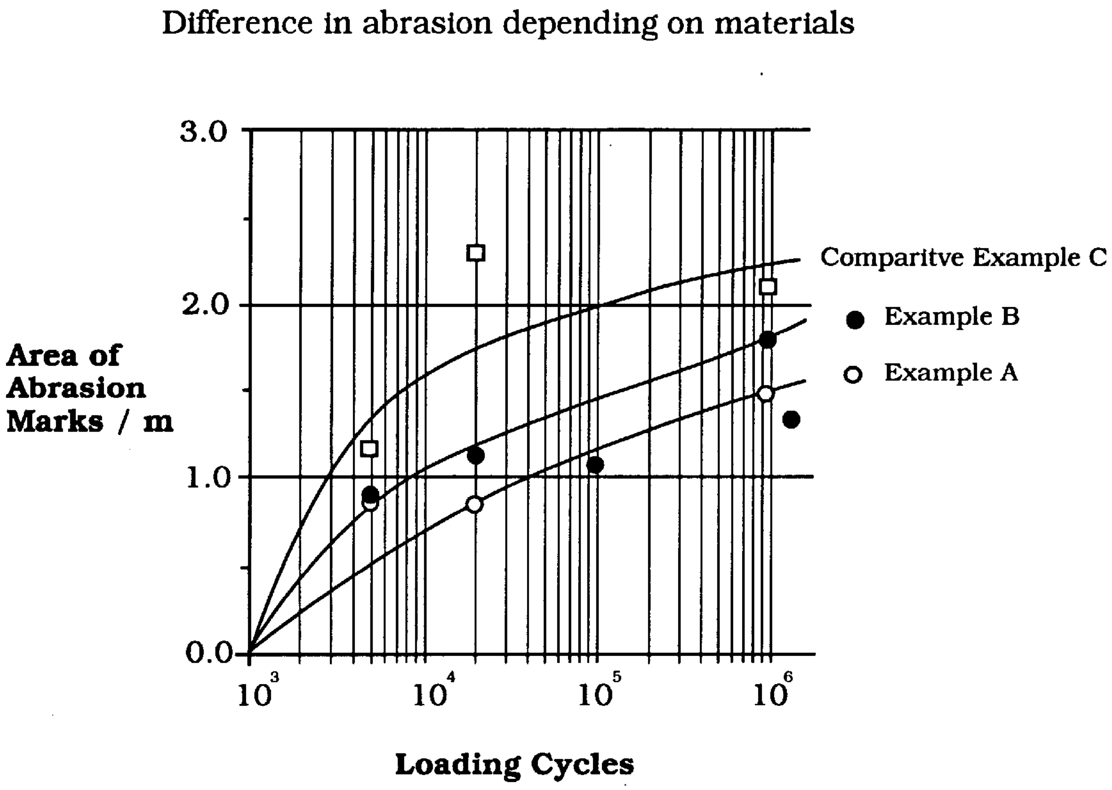
FIG. 8 is a graphical view showing the abrasion resistance of two examples of the invention (A & B) in relation to a conventional structure (C).
Figure 9:
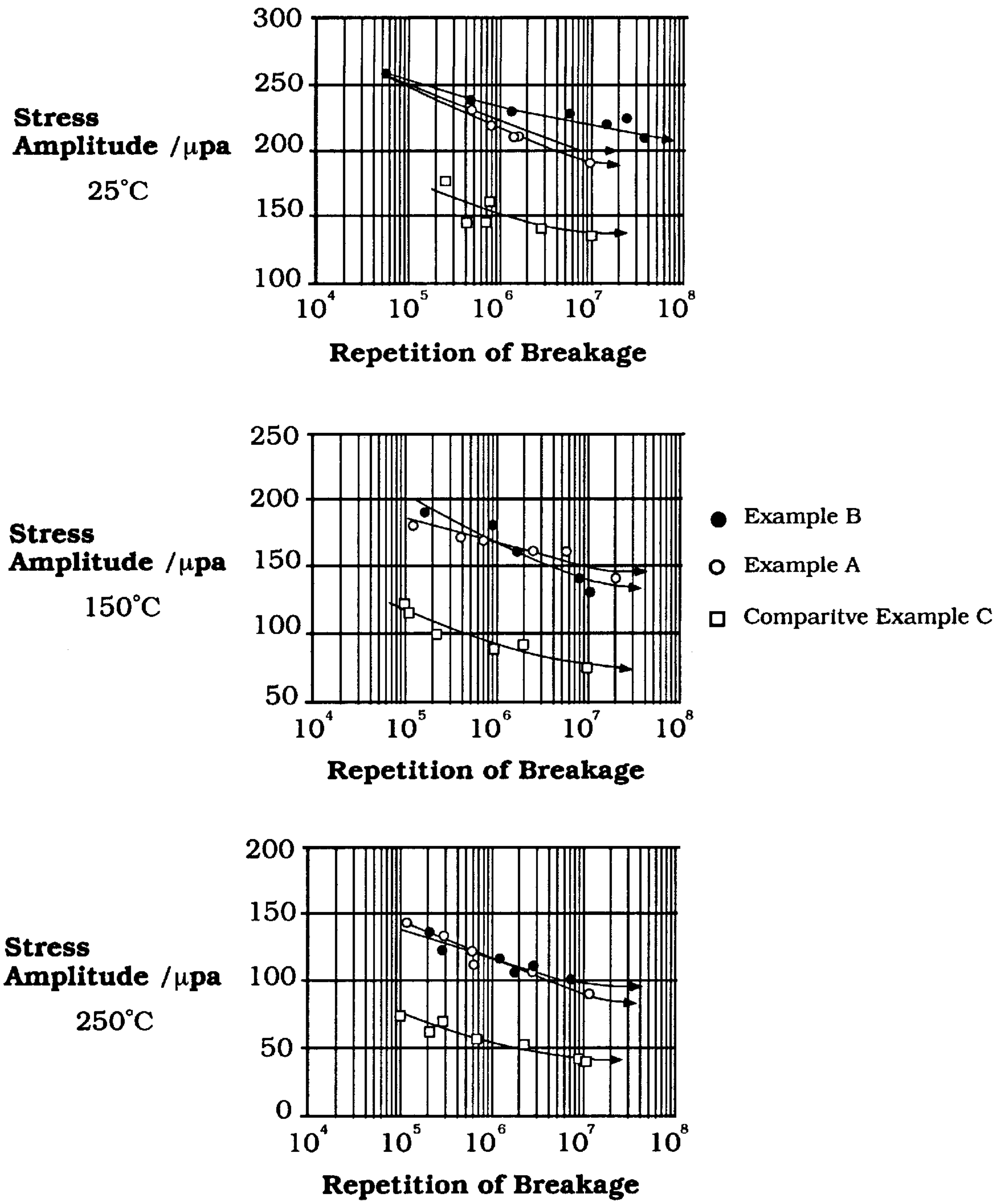
FIG. 9 is a graphical view showing the fatigue strength of the aforenoted materials constructed in accordance with the invention and the prior art type construction under varying heat conditions.

FIGS. 8 and 9 show the comparison of the two aforenoted examples A and B with the conventional structure previously indicated at C.

FIG. 8 is an abrasion resistance curve and shows how the abrasion resistance of the materials embodying the invention is substantially improved from the prior art construction. This abrasion test is carried out by forming the piston and then subjecting it to a conventional fretting abrasion test. The area of abrasion marks at the end of this test, which is performed at a temperature of about 250° C. indicates the abrasion resistance. The lower area of abrasion the greater the resistance.

FIG. 9 also shows the fatigue strength tested by a cyclic application of sinusoidal pressures to the skirt of the piston during temperatures. Again, it will be seen that the stress amplitude is substantially lower for the number of cycles required to achieve breakage with the conventional structure than those embodying the invention.

Therefore, it should be readily apparent to those skilled in the art that the described methodology and material permit the formation of higher strength, lighter weight pistons than with previous construction. Of course, the foregoing description and examples are preferred embodiments of the invention. Those skilled in the art will readily understand how various modifications and variations may be made without departing from the spirit and scope of the invention, as defined by the appended claims. For example the piston skirt only may be formed from the materials and in the methods described and then bonded and/or otherwise attached to a head formed in a different manner or from different materials.

What is claimed is:

1. A method of forming a piston for a reciprocating machine such as an engine, said method comprising the steps of forming a blank from a powdered material that is comprised of aluminum alloyed with a material selected from the group of silicon (Si) and iron (Fe) having a particle diameter not greater than 10 μm, and forging the blank into at least a piston skirt.

2. A method of forming a piston as set forth in claim 1 wherein the alloying material comprises silicon (Si).

3. A method of forming a piston as set forth in claim 2 wherein the silicon (Si) is in an amount of 10–22% by weight of the alloy.

4. A method of forming a piston as set forth in claim 1 wherein the alloying material comprises iron (Fe).

5. A method of forming a piston as set forth in claim 4 wherein the iron (Fe) is in an amount of 1–10% by weight of the alloy.

6. A method of forming a piston as set forth in claim 4 wherein the alloying material also comprises silicon (Si).

7. A method of forming a piston as set forth in claim 6 wherein the silicon (Si) is in an amount of 10–22% by weight of the alloy.

8. A method of forming a piston as set forth in claim 6 wherein the iron (Fe) is in an amount of 1–10% by weight of the alloy.

9. A method of forming a piston as set forth in claim 8 wherein the silicon (Si) is in an amount of 10–22% by weight of the alloy.

10. A method of forming a piston as set forth in claim 1 wherein the alloying material also comprises a material harder than silicon (Si).

11. A method of forming a piston as set forth in claim 10 wherein the alloying material harder than silicon (Si) is selected from the group comprised of silicon carbide (SiC), aluminum oxide ($Al_2O_3$) and aluminum nitride (AlN).

12. A method of forming a piston as set forth in claim 11 wherein the amount of alloying material from the group comprised of silicon carbide (SiC), aluminum oxide($Al_2O_3$) and aluminum nitride (AlN) is in the range of 1–10% by weight of the alloy.

13. A method of forming a piston as set forth in claim 1 wherein the powdered alloy is formed by forming an ingot from the alloy of aluminum and an alloying material, melting the ingot, dispersing the resulting liquid as a spray in a chilling stream to form powdered metal particles and compressing the powdered metal particles into a blank for subsequent forging.

14. A method of forming a piston as set forth in claim 13 wherein the forging is done at a material temperature less than 700° C.

15. A method of forming a piston as set forth in claim 14 wherein the forging is done at a material temperature in the range of 400–500° C.

16. A method of forming a piston as set forth in claim 15 wherein the material is heated to the temperature prior to the forging.

17. A method of forming a piston as set forth in claim 15 wherein the material is heated to the temperature during the forging.

18. A method for forming a powdered alloy into a solidified blank for forming at least a piston skirt comprising the steps of forming an ingot from the alloy of aluminum and an alloying material, melting the ingot, dispersing the resulting liquid as a spray in a chilling stream to form powdered metal particles and compressing the powdered metal particles into a blank for subsequent forging.

19. A method of forming a powdered alloy into a solidified blank as set forth in claim 18 wherein the compression is done at a material temperature less than 700° C.

20. A method of forming a powdered alloy into a solidified blank as set forth in claim 19 wherein the compression is done at a material temperature in the range of 400–500° C.

21. A method of forming a powdered alloy into a solidified blank as set forth in claim 18 wherein another powder is mixed with the powder formed from the ingot before compression to form the blank.

22. A method of forming a powdered alloy into a solidified blank as set forth in claim 21 wherein the other powder comprises a material harder than silicon (Si) and has a particle size of about 5 μm before compression.

23. A method of forming a powdered alloy into a solidified blank as set forth in claim 22 wherein the alloying material harder than silicon (Si) is selected from the group comprised of silicon carbide (SiC), aluminum oxide ($Al_2O_3$) and aluminum nitride (AlN).

24. A method of forming a powdered alloy into a solidified blank as set forth in claim 23 wherein the amount of alloying material from the group comprised of silicon carbide (SiC), aluminum oxide($Al_2O_3$) and aluminum nitride (AlN) is in the range of 1–10% by weight of the alloy.

* * * * *